United States Patent [19]

Gallucci

[11] Patent Number: 5,354,791

[45] Date of Patent: Oct. 11, 1994

[54] EPOXY-FUNCTIONAL POLYESTER, POLYCARBONATE WITH METAL PHOSPHATE

[75] Inventor: Robert R. Gallucci, Mt. Vernon, Ind.

[73] Assignee: General Electric Company, Pittsfield, Mass.

[21] Appl. No.: 139,390

[22] Filed: Oct. 19, 1993

[51] Int. Cl.$^5$ .................. C08K 7/14; C08L 67/02; C08L 69/00

[52] U.S. Cl. ........................ 523/466; 525/438

[58] Field of Search ................. 523/466; 525/438

[56] References Cited

U.S. PATENT DOCUMENTS

| | | | |
|---|---|---|---|
| 2,465,319 | 3/1949 | Rex et al. | 260/75 |
| 2,999,835 | 9/1961 | Goldberg | 260/42 |
| 3,028,365 | 4/1962 | Schnell et al. | 260/47 |
| 3,030,331 | 4/1962 | Goldberg | 260/42 |
| 3,047,539 | 7/1962 | Pengilly | 260/75 |
| 3,169,121 | 2/1965 | Goldberg | 260/47 |
| 3,275,601 | 9/1966 | Schnell et al. | 260/47 |
| 3,334,154 | 8/1967 | Kim | 260/860 |
| 3,635,895 | 1/1972 | Kramer | 260/47 |
| 3,886,104 | 5/1975 | Borman et al. | 260/22 |
| 3,915,926 | 10/1975 | Wambach | 260/40 |
| 3,937,751 | 2/1976 | Schmid et al. | 525/438 |
| 3,978,020 | 8/1976 | Liberti | 260/45.8 |
| 3,979,477 | 9/1976 | Schmid et al. | 525/444 |
| 3,985,825 | 10/1976 | Schmid et al. | 525/438 |
| 4,001,184 | 1/1977 | Scott | 260/47 |
| 4,020,122 | 4/1977 | Borman et al. | 260/835 |
| 4,071,504 | 1/1978 | Korver | 260/75 |
| 4,141,882 | 2/1979 | Kodama et al. | 260/40 |
| 4,188,314 | 2/1980 | Fox et al. | 260/37 |
| 4,246,378 | 1/1981 | Kometani et al. | 525/438 |
| 4,401,804 | 8/1983 | Wooten et al. | 528/272 |
| 4,487,896 | 12/1984 | Mark et al. | 525/439 |
| 4,532,290 | 7/1985 | Jaquiss et al. | 524/417 |
| 4,533,679 | 8/1985 | Rawlings | 523/204 |
| 4,559,388 | 12/1985 | Liu et al. | 525/146 |
| 4,795,771 | 1/1989 | Yoshihara | 524/114 |
| 4,904,746 | 2/1990 | Brown et al. | 525/438 |
| 4,933,429 | 6/1990 | McCracken et al. | 528/272 |
| 4,999,388 | 3/1991 | Okamoto | 525/437 |
| 5,087,665 | 2/1992 | Chung et al. | 525/133 |
| 5,250,634 | 10/1993 | Toyoda et al. | 525/438 |

*Primary Examiner*—Robert E. Sellers

[57] ABSTRACT

The polyester-polycarbonate blend composition useful as a molding composition shows improved hydrolytic stability. The polyester-polycarbonate comprises polyester having epoxy functionality, polycarbonate, and a catalyst quencher selected from the group of certain quenchers, e.g., metal acid phosphates, metal acid pyrophosphates and metal polyphosphates. Preferred polyesters having epoxy functionality comprise a polyester which is reacted with a difunctional epoxy compound. The invention provides hydrolytic stability which is improved over polyester-polycarbonate compositions which employ other catalyst quenchers for reducing transesterification. The invention also shows hydrolytic stability which is superior to blends in which polyester and polyfunctional epoxy compounds are merely blended with the polycarbonate and catalyst quencher.

30 Claims, No Drawings

EPOXY-FUNCTIONAL POLYESTER, POLYCARBONATE WITH METAL PHOSPHATE

BACKGROUND OF THE INVENTION

1. Field of the Invention

The present invention relates to compositions comprising blends of polycarbonate and polyester. More particularly, the present invention relates to blends of polycarbonate and polyester to which catalyst quenchers are added to control ester-carbonate interchange. The polyester in this invention has epoxy functionality which improves the hydrolytic properties of these catalyst quencher-containing compositions.

2. Related Art

Compositions comprising blends of polyester and polycarbonate have been widely used by industry. For instance, these compositions are widely used in the transportation industry, particularly the automotive industry. These compositions also have been used in the electrical, construction, appliance and houseware industries.

Blends comprising polyester and polycarbonate, however, tend to undergo ester-carbonate interchange, wherein ester linkages in both the polycarbonate and the polyester are believed to be broken and replaced by alkylene carbonate and arylene carboxylate bonds. The result is degradation of the physical properties of the polymers due to hybridization of the molecular linkages therein. Without being held to any particular theory, it is believed that metal catalyst residues from the polymerization reaction forming the polyester promote the ester-carbonate interchange in these compositions. This interchange leads to variability in the articles finally fabricated from the blends.

To deactivate the metal catalyst residues, "catalyst quenchers" have been added to polyester compositions. For example, phosphite quenchers comprise one class of quenchers which has been suggested for deactivating metal catalyst residues in polyester compositions. See J. Devaux, P. Godard, J. P. Mercier, *Polymer and Engineering Science*, Vol. 22, p. 229 (1982). Phosphorous acid also has been used to quench such metal catalysts.

U.S. Pat. No. 4,532,290 to Jaquiss et al. discloses adding monosodium phosphate and/or monopotassium phosphate quenchers to polyester/polycarbonate blends. Commonly assigned and copending application having Ser. No. 994,794, filed Dec. 22, 1992, and commonly assigned, copending application having Ser. No. 995,243, filed Dec. 22, 1992, disclose quenching catalysts by using metal acid pyrophosphates or polyacid pyrophosphates having the general formula $$M^z{}_xH_yP_nO_{3n+1}$$

wherein M is a metal, "x" is a number ranging from 1 to 12, and "y" is a number ranging from 1 to 12, "n" is a number in the range of 2 to 10, "z" is a number in the range of 1 to 5, and the sum of xz+y is equal to n+2.

It has been discovered that some catalyst quenchers, e.g., the phosphorus acid or alkyl phosphites, reduce the hydrolytic stability of the polyester/polycarbonate compositions. In certain instances, the stability of compositions comprising these quenchers under hydrolyzing conditions is decreased to a point that the compositions' stability is unacceptable. Hydrolytic stability is usually reflected in the composition's ability to maintain its melt viscosity over time when exposed to moisture under various conditions. Failure to maintain melt viscosity leads to loss of mechanical properties.

U.S. Pat. No. 5,087,665 to Chung et al. discloses a method of improving the hydrolytic stability of blends of polycarbonate and polyester, i.e., polyethylene terephthalate, by adding polyethylene to the blends. The blends disclosed in this patent, however, do not contain catalyst quenchers and the patent does not address hydrolytic stability problems resulting from these additives. As disclosed above, blends of polyester and polycarbonate lacking these quenchers typically exhibit transesterification and change in melt viscosity to a level that the blends result in articles having variable properties. Under extreme conditions, crystallinity will be lost and gaseous by-products will be produced.

Commonly assigned and copending application Ser. No. 987,588, filed Dec. 8, 1992, discloses stabilizing polyesters against hydrolysis by combining the polyester with epoxy compounds in the presence of a catalyst. The resulting polyester composition is shown to have improved hydrolytic stability and melt viscosity stability. Blends of polyester and polycarbonate comprising catalyst quenchers, however, are not disclosed in this application and the hydrolytic stability problems resulting from catalyst quenchers therefore are not expressly addressed.

Commonly assigned and copending application having Ser. No. 952,219, filed on Sep. 28, 1992, discloses using an epoxy compound to stabilize mineral-filled polyesters against hydrolysis. Barium sulfate, zinc oxide, zirconium sulfate, etc., fillers are disclosed. However, this application also does not disclose blends of polyester and polycarbonate comprising catalyst quenchers, nor does it address the hydrolytic stability problems resulting therefrom.

Epoxy compounds also have been added to polyester compositions to improve their thermal stability. See, for example, U.S. Pat. Nos. 3,978,020; 3,886,104; and 4,020,122. The '020 patent and the '104 patent also mention phosphite or phosphonite additives for improved thermal oxidative stabilization. Improving the hydrolytic stability of these compounds is not disclosed, however, nor is there disclosure of improving the hydrolytic stability of compositions comprising blends of polyester and polycarbonate.

There thus is still a need for blends of polyester and polycarbonate which not only possess improved stabilization against ester-carbonate interchanges, but also show improved hydrolytic stability.

SUMMARY OF THE INVENTION

It thus is an object of this invention to provide compositions comprising blends of polyester and polycarbonate which have good melt stability, as well as improved hydrolytic stability. These properties are exhibited by the composition of this invention, which comprises a polycarbonate, a polyester having epoxy functionality, a catalyst quencher selected from the group consisting of a catalyst quencher selected from the group consisting of Group IB metal phosphate salts, Group IIB metal phosphate salts, and salts of the formula $$M^z{}_xH_yP_nO_{3n+1}$$

wherein M is a metal, x is a number ranging from 1 to 12, and y is a number ranging from 1 to 12, n is a number in the range of 1 to 10, z is a number in the range of 1 to 5, and the sum of xz+y is equal to n+2.

The polyester is functionalized with epoxy by reacting, e.g., extruding, the polyester with a polyfunctional epoxy compound, preferably a diepoxide, prior to adding the polyester to the blend.

It has been discovered that the combination of the above-identified catalyst quenchers and the epoxy functionalized polyester provides unexpectedly improved hydrolytic stability. For example, quenchers such as metal acid pyrophosphates, e.g., sodium and potassium acid pyrophosphates, in combination with the polyfunctional epoxy compound provide hydrolytic stability which is unexpectedly superior over compositions comprising the polyester and other catalyst quenchers, e.g., phosphites and phosphorus acid. Blends comprising the polyester having epoxy functionality also show superior hydrolytic stability over compositions in which polyester and polyfunctional epoxy compound have merely been blended. To improve impact resistance, strength or other mechanical properties, compositions according to this invention optionally contain rubbery modifiers, glass fibers or other fillers.

DETAILED DESCRIPTION OF THE INVENTION

The polyester and polycarbonate components of this invention are selected according to their suitability for preparing molded articles. Suitable polyester components include crystalline polyesters such as polyesters derived from an aliphatic or cycloaliphatic diol, or mixtures thereof, containing from 2 to about 10 carbon atoms and at least one aromatic dicarboxylic acid. Preferred polyesters are derived from an aliphatic diol and an aromatic dicarboxylic acid and have repeating units of the following general formula:

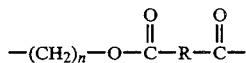

wherein n is an integer of from 2 to 6. R is a $C_6$–$C_{20}$ aryl radical comprising a decarboxylated residue derived from an aromatic dicarboxylic acid.

Examples of aromatic dicarboxylic acids represented by the decarboxylated residue R are isophthalic or terephthalic acid, 1,2-di(p-carboxyphenyl)ethane, 4,4'-dicarboxydiphenyl ether, 4,4'bisbenzoic acid and mixtures thereof. All of these acids contain at least one aromatic nucleus. Acids containing fused rings can also be present, such as in 1,4- or 1,5-naphthalenedicarboxylic acids. The preferred dicarboxylic acids are terephthalic acid or a mixture of terephthalic and isophthalic acids.

The most preferred polyesters are poly(ethylene terephthalate), i.e., ("PET"), and poly(1,4-butylene terephthalate), i.e., ("PBT").

The polyester also contains carboxylic acid end groups. The acid content depends on the desired molecular weight of the polyester and the method in which the polyester is prepared. The acid end group content of preferred polyesters is typically about 25 to about 80 milliequivalents functionality per kilogram (meq/kg) polyester.

Also contemplated herein are the above polyesters with minor amounts, e.g., from about 0.5 to about 5 percent by weight, of units derived from aliphatic acid and/or aliphatic polyols to form copolyesters. The aliphatic polyols include glycols, such as poly(ethylene glycol). All such polyesters can be made following the teachings of, for example, U.S. Pat. Nos. 2,465,319 and 3,047,539.

The polyesters used herein have an intrinsic viscosity of from about 0.4 to about 2.0 dl/g as measured in a 60:40 phenol/tetrachloroethane mixture or similar solvent at 23°–30° C. VALOX®315 polyester is particularly suitable for this invention.

Blends of polyesters may also be employed in the composition. As indicated earlier, preferred polyesters are poly(ethylene terephthalate) and poly(1,4-butylene terephthalate). When blends of these preferred components are employed the polyester resin component can comprise from about 1 to about 99 parts by weight poly(ethylene terephthalate) and from about 99 to about 1 part by weight poly(1,4-butylene terephthalate) based on 100 parts by weight of both components combined.

Polyesters having epoxy functionality also may be blended with other polyesters. Polyfunctional epoxy compounds and methods for functionalizing the polyesters are described later below.

Carbonates suitable for compositions of this invention include both polycarbonates and copolyester carbonates and are employed in amounts relative to the polyester component of 10:90 to 90:10 parts by weight, and preferably 40:60 to 60:40 parts by weight of the combined weight of polycarbonate and polyester.

Polycarbonates and a method of their preparation by interfacial polymerization are well known; see, for example, the details provided in the U.S. Pat. Nos. 3,028,365; 3,334,154; 3,275,601; 3,915,926; 3,030,331; and 4,188,314, all of which are incorporated herein by reference.

In general, the method of interfacial polymerization comprises the reaction of a dihydric phenol with a carbonyl halide (the carbonate precursor).

Although the reaction conditions of the preparative processes may vary, several of the preferred processes typically involve dissolving or dispersing the diphenol reactants in aqueous caustic, adding the resulting mixture to a suitable water immiscible solvent medium and contacting the reactants with the carbonate precursor, such as phosgene, the presence of a suitable catalyst and under controlled pH conditions. The most commonly used water immiscible solvents include methylene chloride, 1,2-dichloroethane, chlorobenzene, toluene, and the like.

The catalyst employed accelerates the rate of polymerization of the dihydric phenol reactant with the carbonate precursor. Representative catalysts include but are not limited to tertiary amines such as triethylamine, quaternary phosphonium compounds, quaternary ammonium compounds, and the like. The preferred process for preparing polycarbonate resins of the invention comprises a phosgenation reaction.

The dihydric phenols employed are known, and the reactive groups are the two phenolic hydroxyl groups. Some of the dihydric phenols are represented by the general formula:

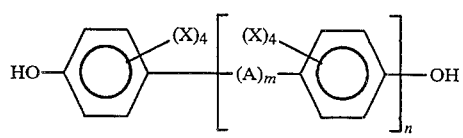

wherein A is a divalent hydrocarbon radical containing from 1 to about 15 carbon atoms; a substituted divalent hydrocarbon radical containing from 1 to about 15 carbon atoms and substituent groups such as halogen;

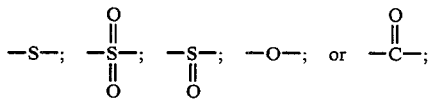

wherein each X is independently selected from the group consisting of hydrogen, halogen, and a monovalent hydrocarbon radical such as an alkyl group of from 1 to about 8 carbon atoms, an aryl group of from 6–18 carbon atoms, an aralkyl group of from 7 to about 14 carbon atoms, an alkaryl group of from 7 to about 14 carbon atoms, an alkoxy group of from 1 to about 8 carbon atoms, or an aryloxy group of from 6 to 18 carbon atoms; and wherein m is zero or 1 and n is an integer of from 0 to 5.

Typical of some of the dihydric phenols that can be employed are bisphenols such as (4-hydroxyphenyl)methane, 2,2-bis(4-hydroxyphenyl)propane (also known as bisphenol-A), 2,2-bis(4-hydroxy-3,5-dibromophenyl)propane, 1,1-bis(4-hydroxyphenyl)-3,3,5-trimethyl cyclohexane, dihydric phenol ethers such as bis(4-hydroxyphenyl) ether, bis(3,5-dichloro-4-hydroxyphenyl) ether, dihydroxydiphenyls such as p,p'-dihydroxydiphenyl, 3,3'-dichloro-4,4'-dihydroxydiphenyl; dihydroxyaryl sulfones such as bis(4-hydroxyphenyl) sulfone, bis(3,5-dimethyl-4-hydroxyphenyl) sulfone, dihydroxybenzenes such as resorcinol, hydroquinone, halo- and alkyl-substituted dihydroxybenzenes such as 1,4-dihydroxy-2,5-dichlorobenzene, 1,4-dihydroxy-3-methylbenzene; and dihydroxydiphenyl sulfides and sulfoxides such as bis(4-hydroxyphenyl) sulfide, bis(4-hydroxyphenyl) sulfoxide and bis(3,5-dibromo-4-hydroxyphenyl) sulfoxide. In certain instances, polycarbonates principally derived from bisphenol A are preferred. A variety of additional dihydric phenols are available and are disclosed in U.S. Pat. Nos. 2,999,835 and 3,028,365 both of which are incorporated herein by reference. It is, of course, possible to employ two or more different dihydric phenols or a combination of a dihydric phenol with glycol.

The carbonate precursor can be either a carbonyl halide, a diarylcarbonate or a bishaloformate. The carbonyl halides include carbonyl bromide, carbonyl chloride, and mixtures thereof. The bishaloformates include the bishaloformates of dihydric phenols such as bischloroformates of 2,2-bis(4-hydroxyphenyl)propane, 2,2-bis(4-hydroxy-3,5-dichlorophenyl)propane, hydroquinone, and the like or bishaloformates of glycols such as bishaloformates of ethylene glycol, and the like. While all of the above carbonate precursors are useful, carbonyl chloride, also known as phosgene, is preferred.

Also included within the scope of the present invention are the high molecular weight thermoplastic randomly branched polycarbonates. These randomly branched polycarbonates are prepared by coreacting a polyfunctional organic compound with the aforedescribed dihydric phenols and carbonate precursor. The polyfunctional organic compounds useful in making the branched polycarbonates are set forth in U.S. Pat. Nos. 3,635,895 and 4,001,184 which are incorporated herein by reference.

The term "carbonate polymers" as used herein is inclusive of copolyestercarbonates, i.e., resins which contain, in addition to recurring polycarbonate chain units of the formula:

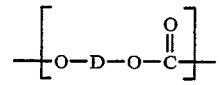

wherein D is a divalent aromatic radical of the dihydric phenol employed in the polymerization reaction, repeating or recurring carboxylate units, for example of the formula:

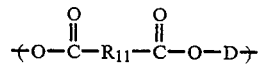

wherein D is as defined above and $R_{11}$ is as defined below.

The copolyester-polycarbonate resins are also prepared by interfacial polymerization techniques, well known to those skilled in the art; see for example the U.S. Pat. Nos. 3,169,121 and 4,487,896.

In general the copolyester-polycarbonate resins are prepared as described above for the preparation of polycarbonate homopolymers, but by the added presence of a dicarboxylic acid (ester precursor) or derivative.

In general, any dicarboxylic acid conventionally used in the preparation of linear polyesters may be utilized in the preparation of the copolyester-carbonate resins of the instant invention. Generally, the dicarboxylic acids which may be utilized include the aliphatic dicarboxylic acids, the aromatic dicarboxylic acids, and the aliphatic-aromatic dicarboxylic acids. These acids are well known and are disclosed for example in U.S. Pat. No. 3,169,121 which is hereby incorporated herein by reference. Representative of such aromatic dicarboxylic acids are those represented by the general formula:

$$HOOC-R_{11}-COOH$$

wherein $R_{11}$ represents an aromatic radical such as phenylene, naphthylene, biphenylene, substituted phenylene and the like; a divalent aliphatic-aromatic hydrocarbon radical such as an aralkyl or alkaryl radical; or two or more aromatic groups connected through non-aromatic linkages of the formula:

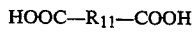

wherein E is a divalent alkylene or alkylidene group. E may also consist of two or more alkylene or alkylidene groups, connected by a non-alkylene or alkylidene group, connected by a non-alkylene or non-alkylidene group, such as an aromatic linkage, an ether linkage, a carbonyl linkage, or by a sulfur-containing linkage such as sulfone and the like. In addition, E may be a cycloaliphatic group of five to twelve carbon atoms, inclusive, (e.g., cyclopentyl, cyclohexyl), or a cycloalkylidene of five to seven carbon atoms, inclusive, such as cyclohexylidene. Thus, in the preferred aromatic difunctional carboxylic acids, $R_{11}$ is an aromatic radical such as phenylene, or substituted phenylene.

Particularly useful aromatic dicarboxylic acids are those represented by the general formula:

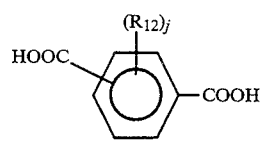

wherein j is a positive whole integer having a value of from 0 to 4 inclusive; and each $R_{12}$ is independently selected from the group consisting of alkyl radicals, preferably lower alkyl radicals (containing from 1 to about 6 carbon atoms) and halogens.

Mixtures of these dicarboxylic acids may be employed. Therefore, where the term dicarboxylic acid is used herein it is to be understood that this term includes mixtures of two or more different dicarboxylic acids.

Most preferred as aromatic dicarboxylic acids are isophthalic acid, terephthalic acids, and mixtures thereof. A particularly useful difunctional carboxylic acid comprises a mixture of isophthalic acid and terephthalic acid wherein the weight ratio of terephthalic acid to isophthalic acid is in the range of from about 10:1 to about 0.2:9.8.

Rather than utilizing the dicarboxylic acid per se, it is possible, and sometimes even preferred, to employ the reactive derivatives of the acid. Illustrative of these reactive derivatives are the acid halides. The preferred acid halides are the acid dichlorides. Thus, it is possible to employ isophthaloyl dichloride, terephthaloyl dichloride, and mixtures thereof.

The proportions of reactants employed to prepare the copolyester-carbonate resins will vary in accordance with the proposed use of the product resin. Those skilled in the art are aware of useful proportions, as described in the U.S. patents referred to above. In general, the amount of the ester bonds may be from about 5 to about 90 mole percent, relative to the carbonate bonds. For example, 5 moles of bisphenol A reacting completely with 4 moles of isophthaloyl dichloride and 1 mole of phosgene would give a copolyester-carbonate of 80 mole percent ester bonds.

The preferred polycarbonates for use in the present invention are those derived from bisphenol A and phosgene and having an intrinsic viscosity of about 0.3 to about 1.5 deciliters per gram in methylene chloride at 25°. LEXAN®101 polycarbonate is particularly suitable for this invention.

As indicated above, polyesters are typically prepared using metal catalysts which remain in the polyester product. Polyesters, for example, are prepared using catalysts such as organic or inorganic compounds of arsenic, cobalt, tin, antimony, zinc, titanium, magnesium, calcium, manganese, gallium, germanium, sodium, lithium, and the like. Titanium compounds, such as tetraalkyl titanates, are frequently used. The preparation of polyesters employing these metallic catalysts are described, for example, in U.S. Pat. No. 4,401,804 which is incorporated herein by reference. As indicated above, residues of these metal catalysts may cause transesterification between the polyester and polycarbonate.

A number of catalyst quenchers have been used to deactivate these metal residues. For instance, quenchers such as phosphorus acid, phosphoric acid and phosphites or phosphonites have been included in compositions comprising polyester and/or polycarbonate in order to improve the thermal stability of the composition. It has been discovered, however, that compositions quenched with these additives generally have unacceptable hydrolytic stability. On the other hand, when polyesters having epoxy functionality are included in a blend with polycarbonate and catalyst quenchers such as metal acid phosphates, metal acid pyrophosphates and metal polyphosphates the polyester and polycarbonate blend shows improved hydrolytic stability.

Quenchers suitable for this invention thus include metal acid phosphates, metal acid pyrophosphates and metal pyrophosphates, each being embraced by the general formula $$M^z{}_xH_yP_nO_{3n+1}$$

wherein M is a metal, "x" is a number ranging from 1 to 12, and "y" is a number ranging from 1 to 12, "n" is a number in the range of 1 to 10, "z" is a number in the range of 1 to 5, and the sum of xz+y is equal to n+2.

The metal acid pyrophosphates of this invention preferably comprise metals from Group 1A of the Periodic Table of Elements, particularly, sodium and potassium. Suitable pyrophosphates embraced by the formula above include $Na_3HP_2O_7$, $K_2H_2P_2O_7$, $KNaH_2P_2O_7$, $MgH_2P_2O_7$ and $NaH_2PO_4$. The preferred metal acid pyrophosphate for use in the compositions of this invention is sodium dihydrogen pyrophosphate, i.e., $Na_2H_2P_2O_7$.

Other preferred catalyst quenchers include metal acid phosphates such as monosodium phosphate, monopotassium phosphate, zinc acid phosphate and calcium acid phosphate.

The catalyst quencher preferably is present in the composition in the range of about 0.005 parts to about 5.0 parts by weight of the polyester component and most preferably from about 0.1 parts to about 2.0 parts.

The above-mentioned acid phosphates and pyrophosphates may be mixed with the polymers by any suitable means. Since most phosphates are solids, they can be most expeditiously mixed with the resin either as a pre-compounded concentrate or directly into the melt, e.g., in an extruder.

The metal acid phosphates and pyrophosphates preferably will have particle diameters of less than 75 microns, more preferably less than 50 microns, and most preferably less than 20 microns. If the particles have a diameter equal to or greater than 75 microns, the compositions containing the metal acid pyrophosphates may have reduced impact strength.

Additional quenchers suitable for this invention include Group IB and Group IIB metal phosphate salts such as zinc phosphate.

Hydrates and mixtures of the above salts also are suitable as quenchers for the composition of this invention. Reference to any of the above salts, thus, also are meant to refer to the hydrates and/or mixtures containing those salts. Preferred hydrates include dihydrates and tetrahydrates.

As indicated above, inclusion of a polyester having epoxy functionality results in compositions having improved hydrolytic stability. The polyester can be functionalized by prereacting, e.g., preextruding, a polyester with a polyfunctional epoxy compound. The term "polyfunctional epoxy compound" is defined to embrace a compound having at least two epoxy functionalities. Preferably the compound contains only carbon, hydrogen and oxygen. The compound also preferably has a molecular weight of below about 1000 to facilitate reaction with the polyester. Difunctional epoxy compounds are preferred because branching or gelling of the polyester is minimized.

Most preferred difunctional epoxy compounds are difunctional cycloaliphatic epoxy compounds having the following formula,

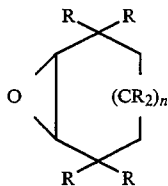

wherein R is H, alkyl, aryl, halo, alkoxy, carboalkoxy, or carbonyl, n is 0 to 8, and preferably n is 0 is 2. At least one R must have an epoxide group. Each R can be different or identical. A preferred difunctional epoxy compound of this formula is a compound wherein n is 0, e.g., at least one epoxide is on a cyclohexyl. A preferred epoxy compound is 3,4-epoxycyclohexyl-3,4-epoxycyclohexylcarboxylate, commercially available as ERL-4221 epoxy from Union Carbide.

Examples of other preferred difunctional epoxy compounds are bis(3,4-epoxycyclohexylmethyl)adipate, vinylcyclohexene di-epoxide, bisphenol diglycidyl ethers, diglycidyl adducts of amides, diglycidyl adducts of carboxylic acids and the like.

Particular epoxy compounds suitable for use in this invention include 3,4-epoxy-6-methylcyclohexylmethyl-3',4'-epoxy-6'-methylcyclohexane carboxylate, 2,3-epoxy-cylcohexylmethyl-3,4-epoxy cyclohexane carboxylate, 4-(3,4-epoxy-5-methylcyclohexyl) butyl-3',4'-epoxy cycloxane carboxylate, 3,4-epoxy cyclohexyl ethylene oxide, bisphenol-A diglycidyl ether, tetrabromobisphenol-A diglycidyl ether, diglycidyl ester of phthalic acid, diglycidyl ester of hexahydrophthalic acid, epoxidized soybean oil, epoxidized linseed oil, bis-epoxycyclohexyl adipate, butadiene diepoxide, and epoxidized polybutadiene.

Polyfunctional epoxy compounds can be made by techniques well known to those skilled in the art. For example, to prepare difunctional epoxy compounds the corresponding $\alpha,\beta$-dihydroxy compounds can be dehydrated to produce the epoxide groups. In the alternative, corresponding unsaturated compounds can be epoxidized by treatment with a peracid, such as peracetic acid, in well-known techniques. Polyfunctional epoxy compounds also are commercially available.

The polyfunctional epoxy compound may be added to the polyester in any effective amount, but preferably small amounts are used, e.g., at a range of about 0.5 to about 5 percent by weight. However, a particularly preferred range is from about 1.5 to about 3.0 percent by weight based on the combined weights of polyester and the polyfunctional epoxy compound.

A catalyst which is effective in promoting reaction of the polyester and polyfunctional epoxy compound also is preferably added to the polyester and epoxy compound reaction mixture. Preferred catalysts are salts free from direct carbon-phosphorous bonds and containing at least one of alkali metal cations or alkaline earth metal cations or halide anions. The preferred catalysts include alkali metal halides, alkali metal carboxylates and alkali metal carbonates. Illustrative compounds within this class are lithium fluoride, lithium iodide, potassium bromide, potassium iodide, sodium dihydrogen phosphate, sodium acetate, sodium benzoate, sodium caproate, sodium stearate, sodium ascorbate and magnesium caproate.

The catalyst component can be present in the composition of the present invention in any effective amount. Preferably the catalyst is present in an amount ranging from about 0.01 to about 1 weight percent, more preferably from about 0.03 to about 0.1 weight percent based on the total weight of the polyester and polyfunctional epoxy compound.

One method of preparing the polyester having epoxy functionality comprises reacting the polyfunctional epoxy compound with dry polyester and heating the reaction mixture to an elevated temperature, e.g., 240° C. to about 300° C., preferably about 275° C. The reaction mixture also preferably contains the catalyst used to promote the reaction of the polyfunctional epoxy compound and polyester. Compounding the polyester and epoxy compound should be carried out to insure that temperature is carefully controlled. Preferably the compounding is continued until an intimate blend between the resin, any catalyst and polyfunctional compound is obtained.

Preextrusion of polyester and polyfunctional epoxy compound can be carried out according to several techniques. A "split-stream" extruder may be used, for example, wherein the polyester, polyfunctional epoxy compound, and catalyst can be added separately and then reacted in one section of an extruder. The reaction product thereof then is introduced to another section of the extruder to be blended with polycarbonate and other optional components of the blend. Alternatively, the polyester and polyfunctional epoxy compound can be reacted in one extruder and then introduced to an extruder downstream for compounding with the polycarbonate component of this invention.

The polyester and polyfunctional epoxy compound can also be prereacted in melt and solution.

The polyester and polyfunctional epoxy compound are reacted to produce a polyester having 20–200 milliequivalents epoxy functionality per kilogram (meq/kg), preferably 30–70 meq/kg. As a result, the carboxylic acid functionality of the polyester generally is low. Typically, the carboxylic acid functionality content is below 15 meq/kg, depending on the method of manufacture. Performance of the polyester will generally be improved with lower acid functionality.

The prereacted polyester component then is blended with the other components of this invention, e.g., the polycarbonate and appropriate quencher. The components are blended according to conventional blending procedures, with the resulting blend extruded to produce molding pellets.

The blend composition may optionally comprise a rubbery impact modifier. Suitable modifiers include core-shell polymers built up from a rubber-like core on which one or more shells have been grafted. The core typically consists substantially of an acrylate rubber or a butadiene rubber. One or more shells typically are grafted on the core. The shell preferably comprises a vinylaromatic compound and/or a vinylcyanide and/or an alkyl(meth)acrylate and/or (meth)acrylic acid. The core and/or the shell(s) often comprise multi-functional compounds which may act as a cross-linking agent and/or as a grafting agent. These polymers are usually prepared in several stages.

Olefin-containing copolymers such as olefin acrylates and olefin diene terpolymers can also be used as impact modifiers in the present compositions. An example of an olefin acrylate copolymer impact modifier is ethylene ethylacrylate copolymer available from Union Carbide as DPD-6169. Other higher olefin monomers can be employed as copolymers with alkyl acrylates, for example, propylene and n-butyl acrylate. The olefin diene terpolymers are well known in the art and generally fall into the EPDM (ethylene propylene diene) family of terpolymers. They are commercially available such as, for example, EPYSN 704 from Copolymer Rubber Company. They are more fully described in U.S. Pat. No. 4,559,388, incorporated by reference herein.

Various rubber polymers and copolymers can also be employed as impact modifiers. Examples of such rubbery polymers are polybutadiene, polyisoprene, and various other polymers or copolymers having a rubbery dienic monomer.

Styrene-containing polymers can also be used as impact modifiers. Examples of such polymers are acrylonitrile-butadiene-styrene (ABS), styrene-acrylonitrile, acrylonitrile-butadiene-alpha-methylstyrene, styrene-butadiene, styrene butadiene styrene (SBS), stryene ethylene butylene styrene (SEBS), methacrylate-butadiene-styrene (MBS), and other high impact styrene-containing polymers such as, for example, high impact polystyrene. Other known impact modifiers include various elastomeric materials such as organic silicone rubbers, elastomeric fluorohydrocarbons, elastomeric polyesters, the random block polysiloxane-polycarbonate, the random block polysiloxane-polycarbonate copolymers, and the like. The preferred organopolysiloxane-polycarbonate block copolymers are the dimethylsiloxane-polycarbonate block copolymers.

The composition according to this invention also can comprise any number of conventional additives, such as dyes, pigments, stabilizers, plasticizers, reinforcers, flame retardants, drip retardants, nucleants, and the like. These are added, as desired, for their conventionally employed purposes.

Reinforcing agents and fillers such as minerals also can be employed. Preferred reinforcing agents are mica, milled or flaked glass, wollastonite, clay, talc, carbon, ceramic, titanate fibers, and mixtures thereof. Glass fibers are the most preferred.

Compositions of the present invention may then be formed into various articles by injection molding, blow molding, or extrusion.

As indicated below, the compositions of this invention exhibit improved hydrolytic stability over compositions which do not contain epoxy functionalized polyester. The results also indicate that polycarbonate-polyester compositions containing acid catalyst quenchers described above exhibit hydrolytic stability which is unexpectedly superior to the stability of compositions comprising other catalyst quenchers. The inventive compositions also are superior to polyester and polycarbonate blends prepared by merely blending all of the ingredients together with a polyfunctional epoxy compound.

EXAMPLES

The compositions illustrated in the following examples were prepared by blending the various individual components together on a WP 30 mm twin screw extruder at a temperature in the range of 250° C.–275° C. at 200–300 rpm. The pelletized extrudate was dried and then evaluated for melt viscosity under hydrolyzing conditions. Melt viscosity was measured to evaluate hydrolytic stability because melt viscosity is proportional to molecular weight which determines the mechanical properties of the composition. The melt viscosities of the compositions tested were measured at temperatures indicated below using a Tinius-Olsen melt viscometer with a 0.0825 inch (0.18 cm) orifice and a 21.5 kg load. The viscosity results below are reported in poise. Prior to measuring the viscosity the compositions were aged in a pressure cooker with deionized water under various conditions, also indicated below. All the samples then were dried for two hours or more at 125° C. just prior to measuring viscosity.

In the examples in which polyester was preextruded with polyfunctional epoxy compound, 1.5 percent by weight difunctional epoxy compound was reacted with a carboxylic acid functionalized polyester in the presence of 0.06% by weight sodium stearate, at a temperature of about 280° C. extruded at 100–300 rpms. The epoxy and polyester were reacted so that the resultant carboxylic acid content was below 8 milliequivalents per kilogram (meq/kg) of reaction product and the epoxy functionality content was about 56 meq/kg.

Epoxy functionality content was measured by dissolving a 1 g sample of epoxide functionalized polyester in 50 ml 60/40 mixture of phenol/trichloroethane with 10 ml of a 25% (wt/vol) tetramethyl ammonium bromide solution in glacial acetic acid. A 0.1% solution of crystal violet indicator also was included. The sample was titrated using a 0.05N perchloric acid in a glacial acetic acid/acetic anhydride solution. The carboxylic acid content of the sample was measured by dissolving a sample in o-cresol and methylene chloride and titrating with 0.02N tetrabutyl ammonium hydroxide to a potentiometric endpoint.

Comparison Example A and Examples 1 through 4

Comparison Example A and Examples 1–4 illustrate blends of equal parts of a bisphenol-A based polycarbonate ("PC") and poly(butylene terephthalate) polyester ("PBT"). The PBT illustrated in Comparison Example A does not have epoxy functionality.

Compositions according to this invention are illustrated in Examples 1–4 and comprise PBT preextruded with a difunctional epoxy compound ("PBT-E"). This polyester was preextruded with 1.5% by weight ERL-4221 diepoxide from Union Carbide. The diepoxide is 3,4-epoxycyclohexylmethyl-3,4-epoxy cyclohexane carboxylate. The extrusion was conducted in the presence of 0.06% by weight sodium stearate.

The quencher employed in these compositions, as a percentage by weight of the total compositions, was either sodium dihydrogen phosphate (SDP) or sodium acid pyrophosphate (SAPP).

The components were blended and extruded. The extruded pellets then were exposed to 110° C. in a pressure cooker with deionized water. The melt viscosities of these compounds then were tested at 250° C. after several days. The melt viscosity results and their percentage of melt viscosity retention are indicated in Table 1 below for each of the compositions tested.

As indicated below, the compositions according to the invention showed higher melt viscosity and a higher percentage retention of melt viscosity properties.

TABLE 1

SDP and SAPP Quenchers

|  | Comparison Example A | 1 | 2 | 3 | 4 |
|---|---|---|---|---|---|
|  | 0.3 | 0.3 | 0.3 | 0.3 | 0.9 |
| Quencher | SDP | SDP | SAPP | SAPP | SAPP |
| Polyester | PBT | PBT-E | PBT-E | PBT-E | PBT-E |
| Melt Viscosity (% Retention) | | | | | |
| Initial | 12000 — | 16200 — | 13900 — | 17600 — | 17200 — |
| 1 day | 5100 (43) | 11900 (73) | 10700 (77) | 13900 (79) | 13300 (77) |
| 2 days | 2700 (23) | 8800 (54) | 8000 (58) | 11400 (65) | 9900 (57) |
| 3 days | 1400 (12) | 6100 (38) | 5811 (42) | 9700 (55) | 7100 (41) |

Comparison Examples B–E and F–G

The viscosity results for Comparison Examples B–E and F–G indicate that all quenchers cannot be employed in this invention. Comparison Examples B–E, for example, illustrate that high acid quenchers such as phosphorous acid cannot be employed in this invention. Comparison Examples F–G show that alkyl phosphite, e.g., diphenyl isodecyl phosphite, cannot be employed. Blends of polyester having epoxy functionality and polycarbonate comprising the phosphorous acid quencher exhibited inferior melt viscosity, which was even inferior to the results exhibited by the composition illustrated in Comparison Example A which did not contain a polyester having epoxy functionality. Equal amounts of polyester and polycarbonate were added to the compositions illustrated in Comparison Examples B–E. As indicated in Table 3, equal amounts of polyester and polycarbonate also were added to the compositions illustrated in Comparison Examples F–G. The compositions illustrated in these comparison examples also were aged and tested for melt viscosity retention according to the procedures indicated for Comparison Example A and Examples 1–4.

TABLE 2

Phosphorous Acid Quencher

|  | Comparison Example B | Comparison Example C | Comparison Example D | Comparison Example E |
|---|---|---|---|---|
|  | 0.08 | 0.08 | 0.10 | 0.15 |
| Quencher | $H_3PO_3$ | $H_3PO_3$ | $H_3PO_3$ | $H_3PO_3$ |
| Polyester | PBT | PBT-E | PBT-E | PBT-E |
| Melt Viscosity (% Retention) | | | | |
| Initial | 11100 — | 12500 — | 12900 — | 9900 — |
| 1 day | 3500 (32) | 4400 (35) | 5600 (43) | 2600 (26) |
| 2 days | 1400 (12) | 2000 (16) | 2800 (21) | 600 (6) |
| 3 days | 700 (6) | 1100 (9) | 1500 (12) | 600 (6) |

TABLE 3

Alkyl Phosphite Quencher

|  | Comparison Example F | Comparison Example G |
|---|---|---|
| PC | 50 | 50 |
| PBT | 50 | — |
| PBT-E | — | 50 |
| DPDP | 0.4 | 0.4 |
| Melt Viscosity (% Retention) | | |
| initial | 7389 | 12094 |
| 1 day | 453 (6) | 671 (6) |
| 3 days | 111 (2) | 222 (2) |
| 5 days | — | — |

PC has a 0.535 Intrinsic Viscosity (IV) in $CH_2Cl_2$
PBT has a 1.25 IV in 60/40 mixture of phenol and tetrachloroethane (TCE)
DPDP = Diphenyl isodecyl phosphite

Comparison Examples H–J and Examples 5–6

Comparison Examples H–J and Examples 5–6 further illustrate the superiority of the quenchers employed in this invention wherein the hydrolyzing conditions were varied from the conditions tested in Comparison Example A and Examples 1–4. Comparison Examples H–J and Examples 5–6 also show that the compositions' hydrolytic stability is improved by functionalizing the polyester with polyfunctional epoxy compound. Compare, for example, Comparison Example H and Example 6. The polycarbonate and polyester components used in the earlier examples also were used in the compositions of these examples. The quenchers employed in Examples 5 and 6 were SDP and SAPP, respectively.

The compositions illustrated in Comparison Examples H–J employed 45% aqueous (aq) phosphoric acid quencher. As indicated below, these compositions showed inferior melt viscosity when compared to the compositions containing catalyst quenchers according to this invention, e.g., SDP and SAPP illustrated in Examples 5 and 6.

Table 4 below indicates the component amounts present in each of the compositions illustrated in Comparison Examples H–J and Examples 5–6. After blending the components at 300 rpm on a twin screw extruder, the extruded material was subjected to aging at 85° C. under 94% relative humidity. Melt viscosity then was measured at 250° C.

TABLE 3

Hydrolytic Conditions with 85° C. Aging and 94% Relative Humidity

| | Comparison Example H | 5 | 6 | Comparison Example I | Comparison Example J |
|---|---|---|---|---|---|
| PBT | 50 | — | — | 50 | — |
| PBT-E | — | 50 | 50 | — | 50 |
| PC | 50 | 50 | 50 | 50 | 50 |
| SDP | 0.3 | 0.3 | — | — | — |
| SAPP | — | — | 0.3 | — | — |
| 45% aq PA | — | — | — | 0.08 | 0.08 |
| Melt Viscosity (% Retention) | | | | | |
| Initial | 11990 | 16190 | 13870 | 11090 | 12500 |
| 1 week | 3360 (28) | 9830 (58) | 9450 (68) | 2010 (18) | 2810 (22) |
| 2 weeks | 2203 (18) | 8610 (51) | 8160 (59) | 1210 (11) | 1850 (15) |
| 3 weeks | 2018 (17) | 7300 (43) | 6520 (47) | 790 (7) | 1220 (10) |

Comparison Examples K–N and Examples 7–8

The polycarbonate, polyester, polyester preextruded with difunctional epoxy compound and quenchers employed in earlier examples were used in the blends of these examples. In addition, polyethylene terephthalate (PET) polyester was employed in a blend with PBT polyester as indicated below in Table 5. The amounts of each component also are indicated in Table 5.

Comparison Examples K and L and Example 7 illustrate that polyester having epoxy functionality can be mixed with a non-epoxy functionalized polyester, e.g., PET, to provide improved hydrolytic stability.

Example 8 and Comparative Examples M and N illustrate that merely blending a polyfunctionalized epoxy compound with a polyester/polycarbonate blend does not achieve the hydrolytic stability of the inventive compositions comprising polyester which has been prereacted with a polyfunctional epoxy compound. Indeed, the results in these examples, as well as the results in Comparative Examples K and L and Example 7, indicate that merely blending the polyfunctional epoxy fails to provide any significant improvement.

The ingredients indicated in Table 5 below were blended together at 200 rpm on a WP 30 mm twin screw extruder at 275° C. The pelletized extrudates were dried and the melt viscosities thereof were measured at 250° C. using the viscometer discussed earlier. The extruded pellets then were aged in a pressure cooker at 110° C. for 1, 3 and 5 days. The samples then were dried for two hours at 125° C. and measured for melt viscosity.

Comparison Examples O–P and Examples 9–10

Examples 9–10 illustrate the hydrolytic stability of blends of polycarbonate and polyester comprising optional impact modifiers. The components of these blends are those earlier described in the examples above. The amounts for each of the components are indicated in Table 6 below. The melt viscosity for the compositions in these Examples and Comparison Examples also were aged and tested according to procedures described for Comparison Examples K–N and Examples 7–8. Polyester/polycarbonate blends comprising rubbery modifiers illustrated in Examples 9 and 10 show improved hydrolytic stability over the compositions illustrated in Comparison Examples O and P.

TABLE 6

Impact Modifier Blends

| | Comparison Example O | 9 | Comparison Example P | 10 |
|---|---|---|---|---|
| PC | 45 | 45 | 45 | 45 |
| PBT | 45 | — | 45 | — |
| PBT-E | — | 45 | 1 | 45 |
| SAPP | 0.3 | 0.3 | 0.3 | 0.3 |
| HRGABS | 10 | 10 | — | — |
| MBS | — | — | 10 | 10 |
| Melt Viscosity (% Retention) | | | | |
| initial | 14881 | 13030 | 15163 | 13664 |
| 1 day | 4200 (28) | 5395 (41) | 5778 (38) | 8404 (62) |
| 3 days | 923 (6) | 1544 (12) | 1841 (12) | 3917 (29) |
| 5 days | 231 (2) | 425 (3) | 576 (4) | 1672 (12) |

PC has 0.535 Intrinsic Viscosity (IV) in $CH_2Cl_2$
PBT has 1.25 IV in 60/40 mixture of phenol and tetrachloroethane (TCE)
SAPP = sodium acid pyrophosphate
HRGABS = styrene acrylonitrile butadiene graft copolymer 7.5% by weight acrylonitride/22.5% styrene/70% butadiene
MBS = core shell impact modifier styrene butadiene core with polymethylmethacrylate shell (about 70% by weight butadiene)

TABLE 5

Polyester Blends and Blends of Polyester and Epoxy

| | Comparison Example K | Comparison Example L | 7 | Comparison Example M | Comparison Example N | 8 |
|---|---|---|---|---|---|---|
| PC | 50 | 50 | 50 | 50 | 50 | 50 |
| PBT | 25 | 25 | — | 50 | 50 | — |
| PBT-E | — | — | 25 | — | — | 50 |
| PET | 25 | 25 | 25 | — | — | — |
| Epoxy | — | 1.0 | — | 1.0 | 2.0 | — |
| SAPP | 0.3 | 0.03 | 0.3 | 0.3 | 0.3 | 0.3 |
| Na Stear. | — | 0.05 | .015 | 0.05 | 0.05 | 0.03 |
| Melt Viscosity (% retention) | | | | | | |
| initial | 8968 | 9469 | 7826 | 7763 | 8074 | 9329 |
| 1 day | 4045 (44) | 4122 (44) | 5311 (68) | 3424 (44) | 4082 (51) | 7150 (77) |
| 3 days | 782 (13) | 1187 (13) | 2146 (27) | 1119 (14) | 1633 (20) | 3368 (36) |
| 5 days | 146 (2) | 219 (2) | 545 (7) | 365 (5) | 619 (8) | 2387 (25) |

PC has 0.535 Intrinsic Viscosity (IV) in $CH_2Cl_2$
PBT has 1.25 IV in 60/40 mixture of phenol and tetrachloroethane (TCE)
PET has 0.580 IV in hexafluoroisopropanol (HFIP)
Epoxy = 3,4-epoxycyclohexylmethyl-3,4-epoxycyclohexane carboxylate
Na Stear = Sodium Stearate Comparison Example Q and Example 14

Example 14 illustrates the hydrolytic resistance of glass-filled blends of polycarbonates and polybutylene terephthalate preextruded with epoxy. The components employed in Example 14, as well as Comparison Example Q, are the same components described in earlier examples. The glass fibers employed in these examples are OCF-183E K filament E-glass.

The blends were prepared and tested as described above, i.e., the compositions were extruded and then placed under hydrolyzing conditions at 110° C. The melt viscosities and tensile strength of the aged compositions were tested. Tensile strength was measured on type 5 bars per ASTM D638. The bars were molded at 240° C. on an 80-ton injection molding machine. The pellets were dried before molding for three hours at 125° C. The results below indicate melt viscosity and the percentage of retention of melt viscosity is indicated in parentheses.

TABLE 7

| Filled Blends | Comparison Example Q | Example 14 |
|---|---|---|
| PC | 35 | 35 |
| PBT | 35 | — |
| PBT-E | — | 35 |
| SDP | 0.3 | 0.3 |
| Glass Fibers | 30 | 30 |
| Tensile Strength Kpsi | | |
| Days @ 110° C. | | |
| Initial | 11.2 | 11.7 |
| 1 day | 9.1 | 9.3 |
| 3 days | 8.3 | 8.6 |
| 5 days | 5.9 | 8.2 |
| 11 days | 2.8 | 6.2 |
| Melt Viscosity (% Retention) | | |
| Initial | 22740 | 34120 |
| 1 day | 9710 (43) | 22930 (67) |
| 3 days | 2660 (12) | 12170 (36) |
| 5 days | 570 (03) | 5990 (18) |
| 11 days | * (00) | 1370 (04) |

* = melt viscosity was too low to measure

Comparison Examples R–S and Examples 15–16

These examples illustrate compositions according to this invention which comprise metal phosphate and metal acid phosphate quenchers. Components of the composition and their amounts are indicated in Table 8 below. The components of these compositions are the same compounds illustrated in earlier examples. The quenchers illustrated in these examples are zinc phosphate and mono zinc phosphate dihydrate. The compositions were prepared and blended according to procedures discussed above. The melt viscosity was tested after exposure to water at 110° C. in a pressure cooker for time periods indicated above. The melt viscosity then was measured at 250° C.

TABLE 8

| Blends Quenched with Zinc Salts | | | | |
|---|---|---|---|---|
| | Example 15 | Comparison Example R | Example 16 | Comparison Example S |
| PC | 50 | 50 | 50 | 50 |
| PBT | 0 | 50 | 0 | 50 |
| PBT-E | 50 | 0 | 50 | 0 |
| ZP | 0.6 | 0.6 | 0 | 0 |
| MZP | 0 | 0 | 0.3 | 0.3 |
| Melt Viscosity (% Retention) | | | | |
| Initial | 16615 | 11250 | 16820 | 10943 |
| 1 day | 12654 (76) | 5509 (49) | 13159 (78) | 5126 (47) |
| 3 days | 8424 (51) | 1466 (13) | 8122 (48) | 1238 (11) |
| 5 days | 4681 (28) | 448 (04) | 4330 (26) | 354 (03) |
| 7 days | 2450 (15) | * | 2272 (14) | * |

ZP = Zinc Phosphate
MBS = core shell impact modifier styrene butadiene core
MZP = Mono zinc phosphate dihydrate ($Zn(H_2PO_4)_2 \cdot 2H_2O$)
* = melt viscosity too low to measure

What is claimed:

1. A polyester-polycarbonate composition comprising
   (a) polyester having epoxy functionality,
   (b) polycarbonate, and
   (c) a catalyst quencher selected from the group consisting of Group IB metal phosphate salts, Group IIB metal phosphate salts, and salts of the formula $$M^z{}_xH_yP_nO_{3n+1}$$

wherein M is a metal, x is a number ranging from 1 to 12, and y is a number ranging from 1 to 12, n is a number in the range of 1 to 10, z is a number in the range of 1 to 5, and the sum of xz+y is equal to n+2.

2. A composition according to claim 1 wherein the polyester has epoxy functionality in an amount in the range of about 20 meq/kg to about 200 meq/kg.

3. A composition according to claim 1 wherein the polyester having epoxy functionality is a reaction product of polyester having carboxylic acid functionality and a polyfunctional epoxy compound.

4. A composition according to claim 1 wherein the polyester having epoxy functionality is a reaction product of a polyester having carboxylic acid functionality and a difunctional epoxy compound.

5. A composition according to claim 3 further comprising a catalyst suitable for promoting the reaction of the polyester and polyfunctional epoxy compound.

6. A composition according to claim 3 wherein said polyester is a polyalkylene terephthalate.

7. A composition according to claim 3 wherein said polyester is selected from the group consisting of a poly(1,4-butylene terephthalate), poly(ethylene terephthalate), and blends thereof.

8. A composition according to claim 3 wherein said polyester comprises poly(1,4-butylene terephthalate).

9. A composition according to claim 3 wherein said polyester has an intrinsic viscosity of at least about 0.4 deciliters per gram when measured in a 60:40 mixture of phenol and trichloroethane at 25° C.

10. A composition according to claim 3 wherein the polyfunctional epoxy compound is added in an amount ranging from about 0.5 to about 5.0 percent by weight of the polyester.

11. A composition according to claim 3 wherein the polyfunctional epoxy compound is added in an amount ranging from about 1.5 to about 3.0 percent by weight of the polyester.

12. A composition according to claim 3 wherein the polyfunctional epoxy compound is a cycloaliphatic diepoxide.

13. A composition according to claim 12 wherein the diepoxide is selected from the group consisting of bis(3,4-epoxycyclohexylmethyl)adipate; vinylcyclohexene diepoxide; 3,4-epoxycyclohexyl-3,4-epoxycyclohexylcarboxylate; and mixtures thereof.

14. A composition according to claim 12 wherein the polyfunctional epoxy compound is 3,4-epoxycyclohexylmethyl-3,4-epoxycyclohexane carboxylate.

15. A composition according to claim 1 wherein said catalyst quencher is selected from the group consisting of metal acid phosphates, metal acid pyrophosphates, and metal polyphosphates.

16. A composition according to claim 1 wherein said catalyst is selected from the group consisting of sodium dihydrogen phosphate, sodium acid pyrophosphate, zinc phosphate, zinc acid phosphate, and mixtures thereof.

17. A composition according to claim 1 wherein the polycarbonate is derived from bisphenol-A.

18. A composition according to claim 1 further comprising filler.

19. A composition according to claim 18 wherein the filler is glass fiber.

20. A method of improving the hydrolytic resistance of a blend comprising polyester, polycarbonate and a catalyst quencher, wherein the method comprises reacting the polyester with a polyfunctional epoxy compound to produce a polyester reaction product having epoxy functionality and blending the reaction product with polycarbonate and a catalyst quencher selected from the group consisting of Group IB metal phosphate salts, Group IIB metal phosphate salts, and salts of the formula

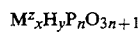

wherein M is a metal, x is a number ranging from 1 to 12, and y is a number ranging from 1 to 12, n is a number in the range of 1 to 10, z is a number in the range of 1 to 5, and the sum of $xz+y$ is equal to $n+2$.

21. A method according to claim 20 wherein the polyfunctional epoxy compound is a difunctional epoxy compound.

22. A method according to claim 20 wherein the polyfunctional epoxy compound is a difunctional cycloaliphatic epoxide.

23. A method according to claim 20 wherein the difunctional cycloaliphatic epoxide is selected from the group consisting of bis(3,4-epoxycyclohexylmethyl)adipate; vinylcyclohexene diepoxide; 3,4-epoxycyclohexyl-3,4-epoxycyclohexylcarboxylate; and mixtures thereof.

24. A method according to claim 20 wherein the polyfunctional epoxy compound is added in an amount raging from about 0.5 to about 5% by weight of the polyester.

25. A method according to claim 20 wherein the polyfunctional epoxy compound is added in an amount ranging from about 1.5 to about 3.0% by weight of the polyester.

26. A method according to claim 20 further comprising reacting the polyester and the polyfunctional epoxy compound in the presence of a catalyst effective in promoting the reaction of the polyester and the epoxy compound.

27. A method according to claim 26 wherein the catalyst is a carboxylic acid salt.

28. A method according to claim 20 wherein the catalyst quencher is selected from the group consisting of sodium dihydrogen phosphate, sodium acid pyrophosphate, zinc phosphate, zinc acid phosphate, and mixtures thereof.

29. A method according to claim 14 further comprising adding a filler.

30. A method according to claim 29 wherein the filler is glass fiber.

* * * * *